United States Patent
Whinnett

(10) Patent No.: US 8,385,836 B2
(45) Date of Patent: Feb. 26, 2013

(54) METHOD AND DEVICE IN A COMMUNICATION NETWORK

(75) Inventor: Nicholas William Whinnett, Marlborough (GB)

(73) Assignee: Mindspeed Technologies U.K., Limited, Bath (GB)

( * ) Notice: Subject to any disclaimer, the term of this patent is extended or adjusted under 35 U.S.C. 154(b) by 146 days.

(21) Appl. No.: 12/794,254

(22) Filed: Jun. 4, 2010

(65) Prior Publication Data

US 2010/0311412 A1    Dec. 9, 2010

(30) Foreign Application Priority Data

Jun. 5, 2009  (GB) .................................. 0909650.4

(51) Int. Cl.
*H04B 17/00* (2006.01)

(52) U.S. Cl. ...................... 455/67.11; 455/423; 455/424; 455/425; 455/67.13; 455/67.14; 455/115.1; 455/115.2; 455/115.3; 455/115.4

(58) Field of Classification Search .................. 455/423, 455/424, 425, 67.11, 67.13, 67.14, 115.1, 455/115.2, 115.3, 115.4

See application file for complete search history.

(56) References Cited

U.S. PATENT DOCUMENTS

| | | | | |
|---|---|---|---|---|
| 5,386,495 | A * | 1/1995 | Wong et al. | 375/224 |
| 6,829,296 | B1 * | 12/2004 | Troulis et al. | 375/232 |
| 7,672,836 | B2 * | 3/2010 | Lee et al. | 704/207 |
| 2002/0045433 | A1 * | 4/2002 | Vihriala | 455/313 |
| 2005/0282500 | A1 * | 12/2005 | Wang et al. | 455/67.13 |
| 2006/0087323 | A1 | 4/2006 | Furse et al. | |
| 2009/0080550 | A1 * | 3/2009 | Kushioka | 375/260 |
| 2009/0215390 | A1 * | 8/2009 | Ku et al. | 455/23 |
| 2010/0105345 | A1 * | 4/2010 | Thampi et al. | 455/214 |

* cited by examiner

*Primary Examiner* — Olumide T Ajibade Akonai
(74) *Attorney, Agent, or Firm* — Weide & Miller, Ltd.

(57) ABSTRACT

There is provided a method of method of estimating a quality of a signal, the method in a first device comprising measuring a signal transmitted from a second device to a third device; determining a value of a metric from an autocorrelation function of the measured signal; and determining an estimate of the quality of the signal from the determined metric.

22 Claims, 11 Drawing Sheets

METHOD AND DEVICE IN A COMMUNICATION NETWORK

TECHNICAL FIELD OF THE INVENTION

The invention relates to communication networks, and in particular to a method in a first device for estimating the quality of a signal transmitted from a second device to a third device.

BACKGROUND TO THE INVENTION

Femtocell base stations in a Long Term Evolution (LTE) communication network (otherwise known as Home evolved Node Bs—HeNBs—or Enterprise evolved Node Bs—EeNBs) are small, low-power, indoor cellular base stations for residential or business use. They provide better network coverage and capacity than that available in such environments from the overlying macrocellular LTE network. In addition, femtocell base stations use a broadband connection to receive data from and send data back to the operator's network (known as "backhaul").

As femtocell base stations can make use of the same frequencies as macrocell base stations in the macrocellular network, and as they are located within the coverage area of one or more macrocell base stations in the macrocellular network, it is necessary to ensure that downlink transmissions from the femtocell base station to mobile devices (otherwise known as User Equipments—UEs) using the femtocell base station do not interfere substantially with downlink transmissions from macrocell base stations to mobile devices using the macrocell base stations.

Typically, this interference is mitigated by placing a cap on the power that the femtocell base station can use to transmit signals to mobile devices. The cap on the power can be set such that, at a specified pathloss from the femtocell base station (for example 80 dB), a signal received by a mobile device from a macrocell base station would meet a specified quality level (for example a target signal to interference plus noise ratio—SINR). The determination of the cap is subject to a minimum and maximum power restriction on the transmission power of the femtocell base station, for example 0.001 W and 0.1 W respectively.

However, this approach has limitations in that the transmission power of the femtocell base station will be capped regardless of whether there are any mobile devices near to the femtocell base station that are communicating with a macrocell base station and that need protecting. This cap can lead to the data throughput for mobile devices communicating with the femtocell base station being unnecessarily restricted.

In providing an approach for setting the maximum permitted transmission power for downlink transmissions from femtocell base stations, it is necessary for the femtocell base station to determine if there are nearby mobile devices that need protecting.

Therefore, there is a need for a method in which the femtocell base station can determine the quality of signals being transmitted from a mobile device to another base station.

SUMMARY OF THE INVENTION

Therefore, according to a first aspect of the invention, there is provided a method of estimating a quality of a signal, the method in a first device comprising measuring a signal transmitted from a second device to a third device; determining a value of a metric from an autocorrelation function of the measured signal; and determining an estimate of the quality of the signal from the determined metric.

Preferably, the step of measuring comprises measuring the signal in the time domain, and the step of determining a value of a metric comprises determining the autocorrelation function of the time domain signal and noise.

Preferably, the step of determining a value of a metric comprises determining the autocorrelation function comprises normalising the measured signal to give a sequence r; taking the fast Fourier transform of this sequence to give f; determining the squared magnitude of each sample in f; and taking the inverse fast Fourier transform of the sequence resulting from the step of determining the squared magnitude to give an autocorrelation sequence a.

In a preferred embodiment, the step of determining a value of a metric from an autocorrelation function of the measured signal comprises calculating the magnitude or squared magnitude of the autocorrelation function.

Preferably, the step of determining a value of a metric further comprises adjusting or zeroing the central tap in the output of the step of calculating.

In a further embodiment, the step of determining a value of a metric further comprises adjusting or zeroing the tap adjacent the central tap in the output of the step of calculating.

In one embodiment, the step of determining a value of a metric comprises identifying the tap with the largest magnitude or squared magnitude in the taps remaining in the output of the step of calculating; and setting the metric to the value of said magnitude or said squared magnitude of the identified tap.

In one embodiment, the step of determining a value of a metric further comprises adjusting the value of the metric based on the distance of the identified tap from the central tap.

In another embodiment the step of determining a value of a metric further comprises adjusting the value of the metric based on a function of a peak to average power ratio of the measured signal.

In this embodiment, the step of adjusting the value of the metric based on a function of a peak to average power ratio of the measured signal preferably comprises, in the event that the peak to average power ratio of the measured signal is below a threshold value, adjusting the value of the metric to a minimum value.

In one embodiment, the step of determining an estimate of the quality of the signal from the determined metric comprises comparing the determined metric to a look-up table.

In an alternative embodiment, the step of determining an estimate of the quality of the signal from the determined metric comprises using a curve-filling technique to match the determined metric to a predetermined relationship between values for the metric and the quality of the signal.

Preferably, the step of measuring comprises measuring a Zadoff-Chu reference signal transmitted from the second device to the third device, and the quality of the signal is a signal to noise ratio.

Preferably, the step of measuring a Zadoff-Chu reference signal comprises estimating the position of the Zadoff-Chu reference signal in time.

Preferably, the step of measuring comprises measuring a portion of the Zadoff-Chu reference signal.

In one embodiment, the method further comprises the step of using a scheduler to ensure that no signals will be transmitted to the first device from other devices associated therewith that might interfere with the execution of the step of measuring.

According to a second aspect of the invention, there is provided a network element for use in a communication network, the network element being configured to perform the method described above.

BRIEF DESCRIPTION OF THE DRAWINGS

The invention will now be described in detail, by way of example only, with reference to the following drawings, in which.

DETAILED DESCRIPTION OF THE PREFERRED EMBODIMENTS

Although the invention will be described below with reference to an LTE communication network and femtocell base stations or HeNBs, it will be appreciated that the invention is applicable to other types of third or subsequent generation network in which femtocell base stations (whether for home or business use), or their equivalents in those networks, can be deployed. Moreover, although in the embodiments below the femtocell base stations and macrocell base stations use the same air interface (LTE), it will be appreciated that the invention can be used in a situation in which the macrocell and femtocell base stations use the same or corresponding frequencies but different air interface schemes (for example the macrocell base stations could use WCDMA while the femtocell base stations use LTE).

Figure 1:
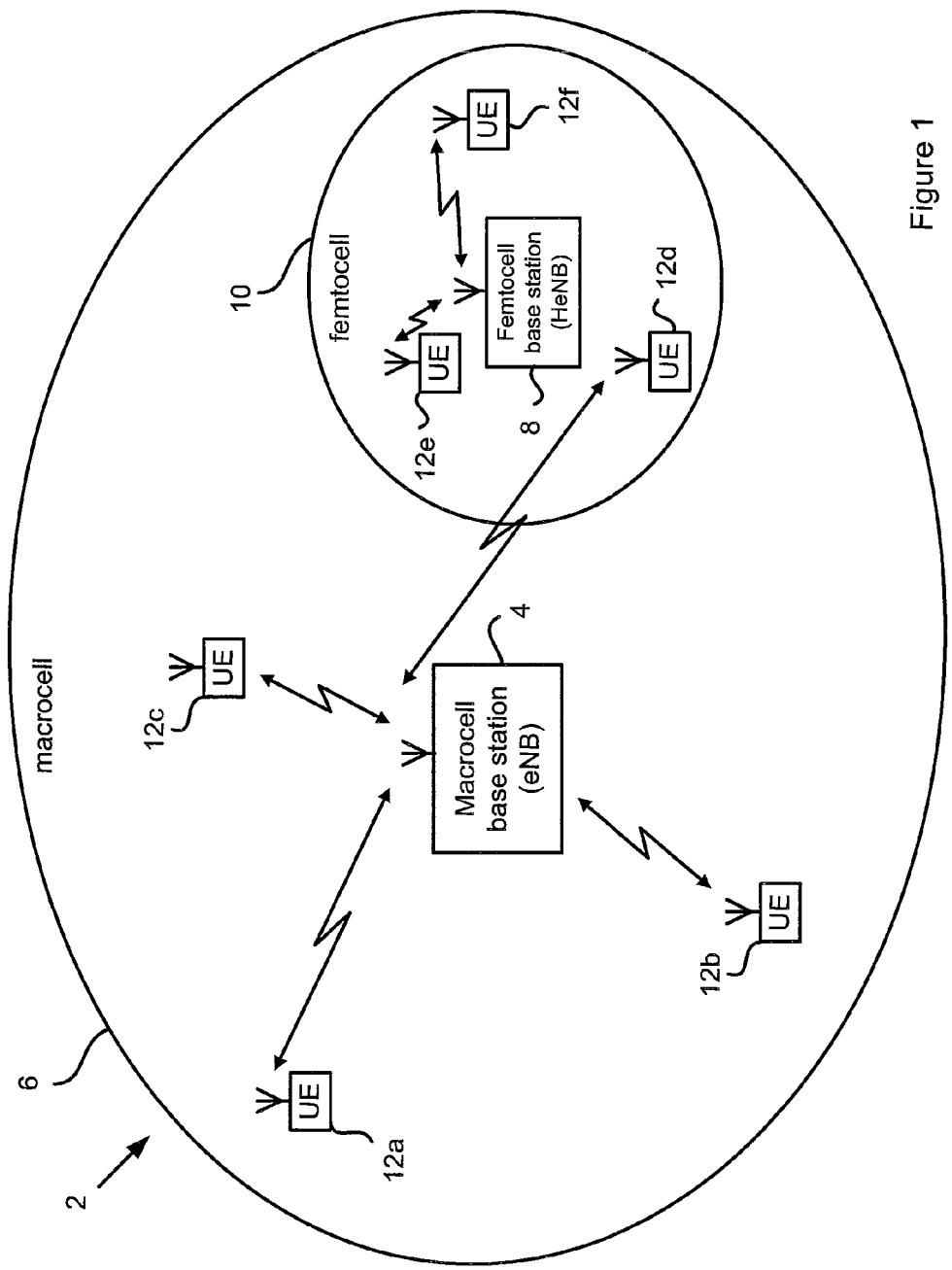
FIG. 1 shows an exemplary communication network.

FIG. 1 shows part of an exemplary communication network 2 in which the invention can be implemented. The communication network 2 includes a plurality of macrocell base stations 4 (only one of which is shown in FIG. 1) that each define a respective coverage area—indicated by macrocell 6. In an LTE communication network, the macrocell base stations 4 are referred to as evolved Node Bs (eNBs).

One or more femtocell base stations 8 (Home eNBs—HeNBs) can be located within the coverage area 6 of the macrocell base station 4 (although only one femtocell base station 8 is shown in FIG. 1), with each femtocell base station 8 defining a respective coverage area—indicated by femtocell 10.

It will be appreciated that FIG. 1 has not been drawn to scale, and that in most real-world implementations the coverage area 10 of the femtocell base station 8 will be significantly smaller than the coverage area 6 of the macrocell base station 4.

A number of mobile devices (UEs) 12 are also located in the communication network 2 within the coverage area 6 of the macrocell base station 4.

Four mobile devices 12a, 12b, 12c and 12d are each associated with the macrocell base station 4, meaning that they transmit and/or receive control signalling and/or data using the macrocell base station 4. It will be noted that although the mobile device 12d is also within the coverage area 10 of the femtocell base station 8, it is associated with the macrocell base station 4 (this could be due to the signal strength of the macrocell base station 4 being significantly better for mobile device 12d than the signal strength of the femtocell base station 8 or the femtocell base station 8 could be restricted to specific subscribers that don't include mobile device 12d, etc.). Mobile devices 12a, 12b, 12c and 12d are referred to collectively herein as "macro-UEs", as they are the mobile devices/user equipments (UEs) associated with the macrocell base station 4.

Two further mobile devices, 12e and 12f, are located within the coverage area 10 of the femtocell base station 8 and are currently associated with the femtocell base station 8, meaning that they transmit and/or receive control signalling and/or data using the femtocell base station 8. Mobile devices 12e and 12f are referred to collectively herein as "femto-UEs", as they are the mobile devices/user equipments (UEs) associated with the femtocell base station 8.

As described above, it is necessary to ensure that the downlink transmissions from the femtocell base station 8 to the femto-UEs 12e and 12f do not prevent nearby macro-UEs (such as macro-UE 12d) from being able to successfully receive downlink transmissions from the macrocell base station 4. A similar requirement exists for a mobile device that is associated with another femtocell base station, in that the downlink transmissions from the femtocell base station 8 to the femto-UEs 12e and 12f should not prevent those mobile devices from successfully receiving the downlink transmissions from their femtocell base station.

As described above, this problem is addressed in conventional networks by applying a cap to the transmission power used by femtocell base stations 8 to transmit signals to femto-UEs. This cap is set to a value that prevents these downlink signals from causing an undesirable level of interference to mobile devices that are not associated with the femtocell base station 8 that are in or near the coverage area 10 of the femtocell base station 8 (such as mobile device 12d in FIG. 1). This cap is applied to the transmission power regardless of whether there are any mobile devices in or near the coverage area 10 of the femtocell base station 8 (so it would be applied, for example, even if mobile device 12d was not present).

Figure 2:
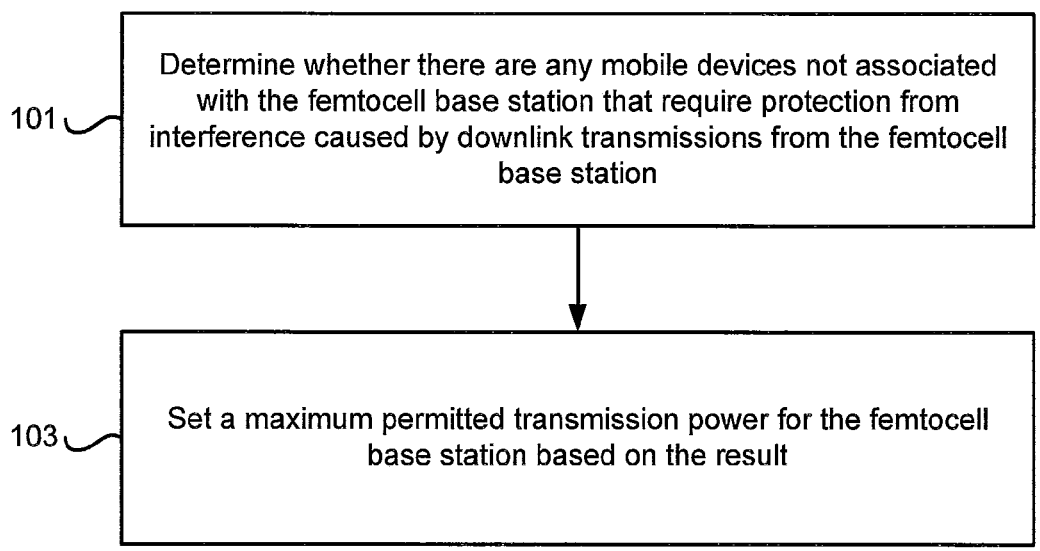
FIG. 2 is a flow chart illustrating a method of setting a maximum permitted transmission power for a femtocell base station.

However, as illustrated in FIG. 2, it is determined whether there are any mobile devices that are not associated with the femtocell base station 8 that require protection from interference caused by downlink transmissions of the femtocell base station 8 (step 101), and the transmission power cap for the femtocell base station 8 is set accordingly (step 103).

Figure 3:
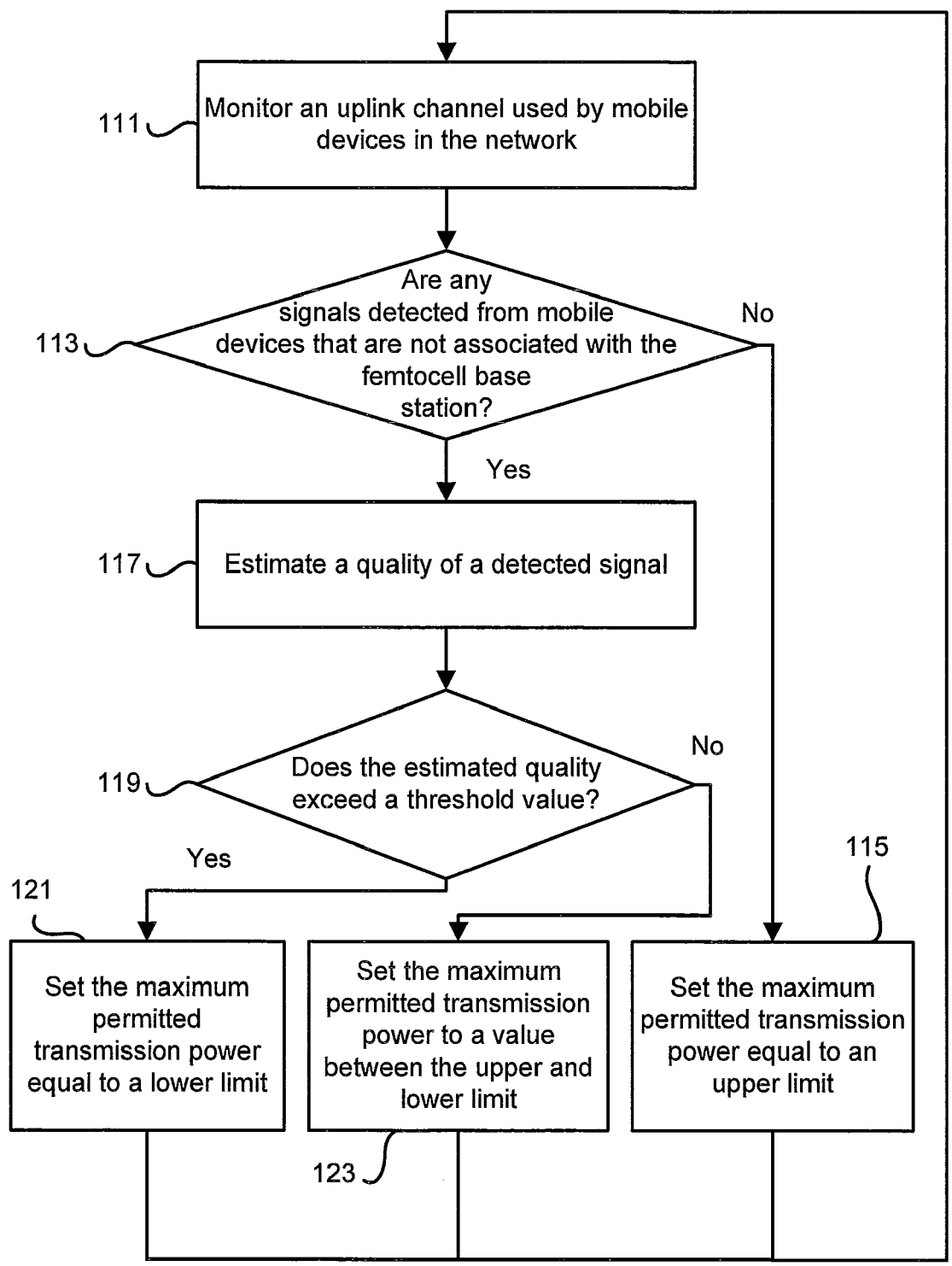
FIG. 3 is a flow chart illustrating the method of FIG. 2 in more detail.

A more detailed method of operating a femtocell base station 8 is illustrated in FIG. 3. In FIG. 3, steps 111, 113, 117 and 119 correspond to the step of determining (step 101) in FIG. 2.

In the following, although the method will be described with reference to protecting mobile device 12d (i.e. a macro-UE) that is associated with macrocell base station 4 from downlink transmissions from the femtocell base station 8, it will be appreciated that a similar method can be used to protect a mobile device that is associated with another femtocell base station.

In step 111, the femtocell base station 8 attempts to identify if there are any macro-UEs 12 that are receiving downlink transmissions from a macrocell base station 4.

In LTE, macro-UEs 12 transmit information to the macrocell base station 4 before, during or after the receipt of a downlink transmission from the macrocell base station 4, for example an acknowledgement (ACK/NACK) signal, a channel quality indicator (CQI), sounding signals, data signals, etc. Therefore, the femtocell base station 8 can monitor uplink channel(s) used by the macro-UEs for these transmissions to determine if there are any mobile devices nearby that might need protecting from its downlink transmissions.

In step 113, it is determined whether any signals detected in step 111 originate from mobile devices that are not being served by (or associated with) the femtocell base station 8.

If the femtocell base station 8 does not detect any signals from macro-UEs 12, then the femtocell base station 8 can assume that there are no macro-UEs nearby that need protecting from its downlink transmissions. In this case, in step 115, the maximum permitted transmission power for the femtocell base station 8 can be set to a high or relatively high value, for example an upper limit for the transmission power (such as 0.1 W in LTE). The method then returns to step 111 and repeats periodically.

If the femtocell base station 8 does detect signals from macro-UEs 12, then the method moves to step 117 in which the femtocell base station 8 estimates a quality of a detected signal. This quality can be a signal to noise ratio (SNR), a signal to noise plus interference ratio (SNIR), a signal strength, or any other measure of the quality of a transmitted signal. In some implementations, depending on the way in which the femtocell base station 8 detects signals in the uplink, the femtocell base station 8 may be able to distinguish signals from multiple macro-UEs 12 and can estimate the quality of each of the signals. However, in alternative implementations, the femtocell base station 8 may not be able to distinguish the signals and therefore performs the estimation on the signal with the highest quality.

In a preferred embodiment of the invention, the femtocell base station 8 identifies characteristics of the Zadoff-Chu reference signal and estimates the signal to noise ratio (SNR) of this signal. This embodiment is described in more detail below with reference to FIG. 4. It will be noted that in this embodiment the femtocell base station 8 does not distinguish between signals from multiple macro-UEs 12 and therefore estimates the SNR for the signal with the highest quality.

In an alternative implementation, the femtocell base station 8 detects and decodes the data in the uplink and determines a quality of the data signals. It will be appreciated by those skilled in the art that alternative techniques can be used by the femtocell base station 8 to determine a quality of the signals in the uplink.

The femtocell base station 8 then compares the estimated quality (or the highest estimated quality if the femtocell base station 8 can estimate the quality for multiple signals) with a threshold value (step 119). In a preferred implementation where the quality is a signal to noise ratio, the threshold can be a value in the range of 10 dB to 30 dB.

It will be noted that a macro-UE 12 will need most protection from the downlink transmissions of the femtocell base station 8 when it is near to the edge of the coverage area 6 of the macrocell base station 4, as the downlink signals received at the macro-UE 12 from the macrocell base station 4 will be relatively weak. In this situation, the macro-UE 12 will need to be transmitting its uplink signals at a relatively high power (due to its distance from the macrocell base station 4). By estimating a quality of the uplink signal (which will be affected by the transmission power of the macro-UE 12d and its proximity to the femtocell base station 8), the femtocell base station 8 can determine whether, and/or the extent to which, the macro-UE 12d needs protecting from the downlink transmissions of the femtocell base station 8.

Therefore, if the estimated quality exceeds the threshold value then the femtocell base station 8 assumes that the macro-UE 12d that originated the signal needs significant protection from the downlink transmissions of the femtocell base station 8, and the maximum permitted transmission power for the femtocell base station 8 should be set at a low or relatively low value (step 121). For example, the maximum permitted transmission power can be set to a lower limit for the transmission power (such as 0.001 W in LTE).

In one implementation, the femtocell base station 8 sets the maximum permitted transmission power such that, at a specified pathloss from the femtocell base station 8 (for example 80 dB), a signal received by the macro-UE 12d from the macrocell base station 4 meets or is estimated to meet a specified quality level (for example a target signal to interference plus noise ratio—SINR), as in a conventional network.

The method then returns to step 111 and repeats periodically.

If the estimated quality does not exceed the threshold value then the femtocell base station 8 sets the maximum permitted transmission power to an intermediate value that lies between an upper and lower limit for the transmission power (step 123). Thus, the femtocell base station 8 provides some protection for the macro-UE 12d, while allowing downlink transmissions from the femtocell base station 8 to be transmitted at a higher power than conventional techniques permit. In this way, the data throughput for femto-UEs 12e and 12f can be improved over the conventional technique.

In a preferred implementation, the intermediate value for the maximum permitted transmission power is selected based on the difference between the estimated quality of the signal and the threshold value. In particular, the value for the maximum permitted transmission power can increase in proportion to the difference between the estimated quality of the signal and the threshold value (up to an upper limit, if applicable). In a preferred embodiment where the quality is a signal to noise ratio, if the estimated SNR is 5 dB below the threshold value, then the maximum permitted transmit power can be set to be 5 dB above the low or relatively low value, subject to the upper limit on the maximum permitted transmit power.

Again, the method returns to step 111 and repeats periodically.

In one implementation of the invention, steps 113 and 117 can be combined, in that the femtocell base station 8 estimates a quality (such as the SNR) of a signal in the uplink and if the estimated quality is above a particular threshold, then a detection of a macro-UE 12 is assumed to have been made. This threshold could be the same or different to the threshold used in step 119.

It will be appreciated that a macro-UE 12d may move into the vicinity of the femtocell base station 8 (i.e. into or near to the coverage area 10 of the femtocell base station 8) without needing to transmit anything to its associated macrocell base station 4 (for example if the macro-UE 12d is not receiving any downlink transmissions from the macrocell base station 4), which means that the femtocell base station 8 will not be able to detect the macro-UE 12d in step 111.

However, as the macro-UE 12d may need to monitor downlink control channels from the macrocell base station 4 (for example a broadcast channel—BCH, or a physical downlink control channel—PDCCH), it is necessary to make sure that the macro-UE 12d is able to receive these downlink transmissions. Although these channels are designed to be relatively robust against interference, the femtocell base station 8 may still interfere with these channels if the transmission power is sufficiently high.

Therefore, in one implementation, the femtocell base station 8 periodically or intermittently sets the maximum permitted transmission power to the lower limit, in order to provide the maximum protection for any macro-UEs 12d in its vicinity, irrespective of whether the femtocell base station 8 detects any signals in steps 111 and 113. For example, the femtocell base station 8 can set the maximum permitted transmission power to the lower limit for 100 milliseconds every 1 second. This will provide opportunities for any macro-UEs 12d that are not transmitting any uplink signals to listen for downlink transmissions from the macrocell base station 4.

In an alternative implementation, the femtocell base station 8 can set the maximum permitted transmission power to the lower limit whenever the femtocell base station 8 is transmitting signals at the same time that the macrocell base station 4 is transmitting control channel signals. In particular, the femtocell base station 8 will typically be synchronised with the macrocell base station 4 and the control channel signals will be sent at predetermined times and on predetermined resource blocks (RBs), so the femtocell base station will know when the macrocell base station 4 will be transmitting the control channel signals. For example, in LTE, some control channel signals are transmitted once every 1 ms (e.g. PFICH, PDCCH), with the first four of fourteen symbols transmitted per 1 ms carrying control channel signals. Other control channels (e.g. PBCH, PSCH) are sent less frequently and use approximately seven symbols out of every 140 symbols and a subset of the available resource blocks.

Estimation of the Quality of an Uplink Reference Signal

As described above, in a preferred embodiment of the invention, the femtocell base station 8 identifies characteristics of the Zadoff-Chu reference signal and estimates the signal to noise ratio (SNR) of this signal.

Unlike WCDMA networks, in LTE the characteristics of uplink reference signals are significantly different to the characteristics of both data transmissions and thermal noise. This method exploits differences in the autocorrelation function between a portion of the time domain reference signal and (filtered) Gaussian noise.

For an uplink reference signal occupying a small number of frequency domain resource blocks, it would be expected that the autocorrelation function with high SNR would deviate from that due to (filtered) Gaussian noise. However, even with a wideband spectrally flat reference signal, such as 50 resource blocks (the maximum for a 10 MHz system), the autocorrelation function of a portion of the time domain reference signal deviates from the filtered Gaussian noise case.

Figure 4A:
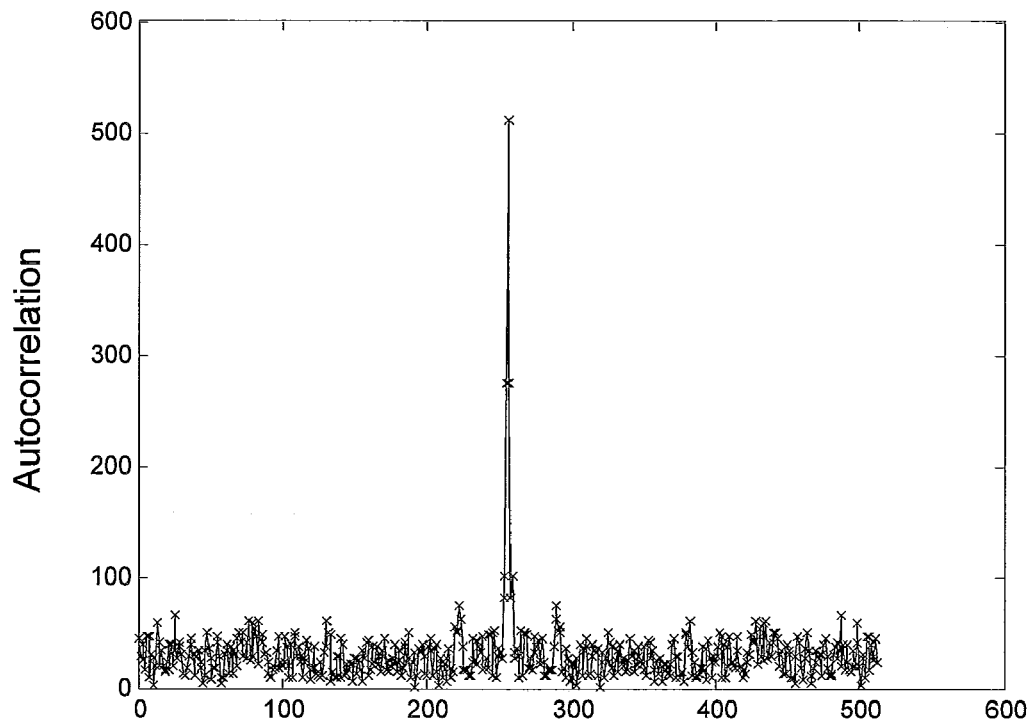
FIGS. 4(a) and 4(b) are graphs illustrating the autocorrelation function for time domain reference signals with low and high signal to noise ratios respectively.
Figure 4B:
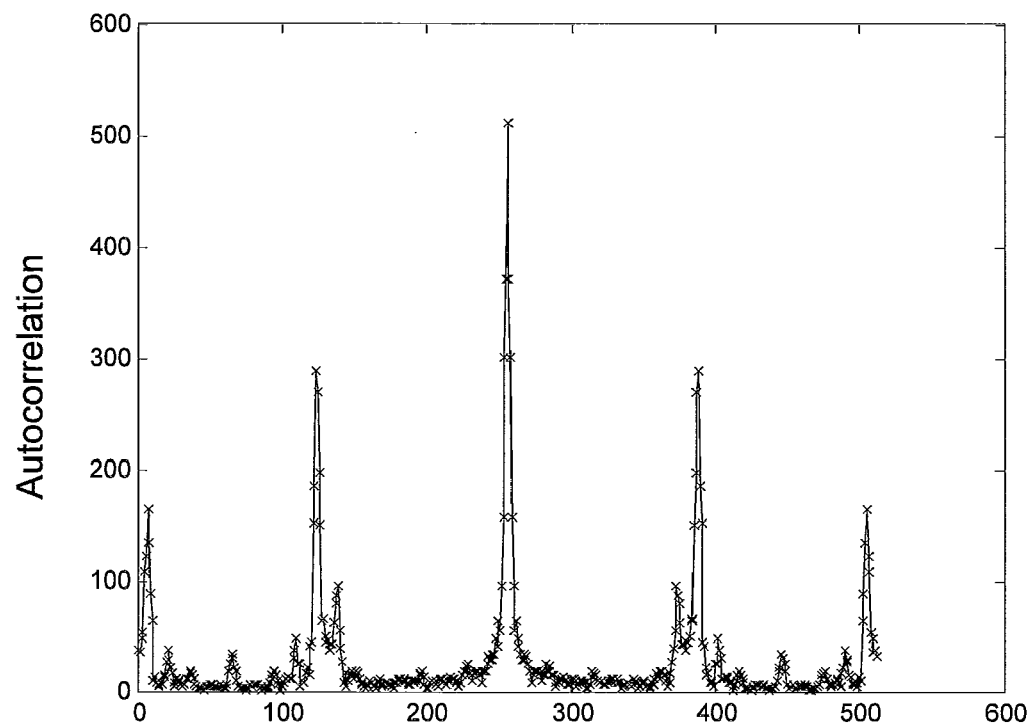

This is true for all the Zadoff-Chu basis sequences, although the nature of the autocorrelation function does depend on the particular Zadoff-Chu basis sequence. An example of the autocorrelation function for low and high SNR cases with 50 resource blocks is shown in FIGS. 4(a) and 4(b) respectively.

It can be seen in FIG. 4 that the low SNR case is dominated by the autocorrelation function of the filtered Gaussian noise, while the high SNR case is dominated by the autocorrelation function of the reference signal.

Figure 5:
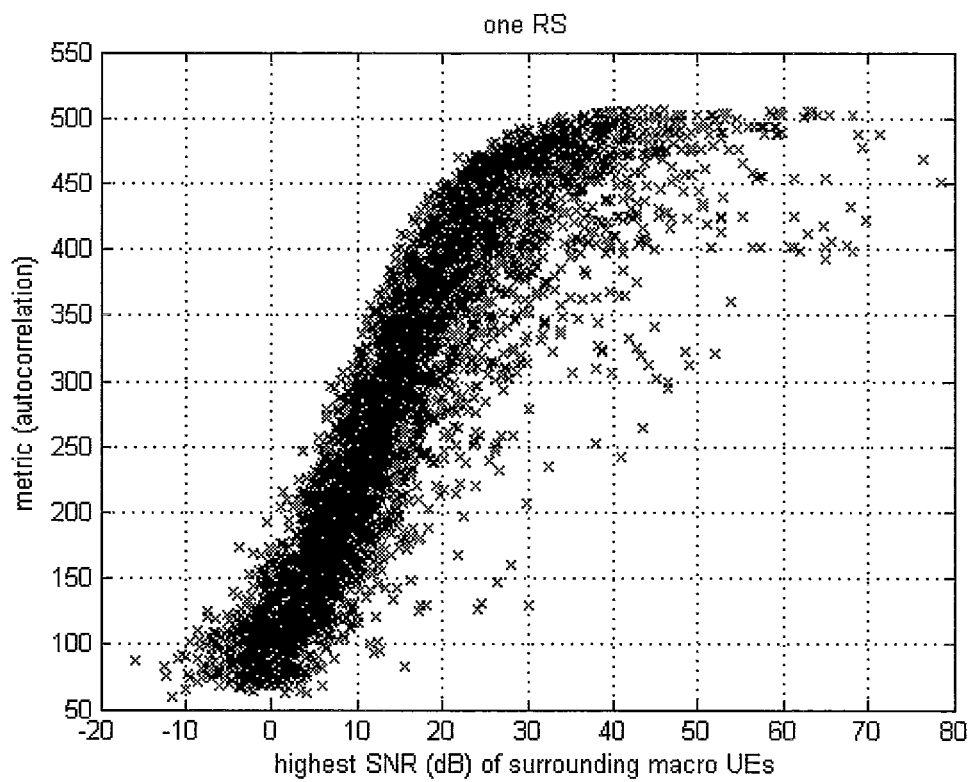
FIG. 5 is a graph illustrating a plot of autocorrelation function peaks against signal to noise ratio.

FIG. 5 shows the results of a simulation in which the autocorrelation peaks from a single reference signal, excluding the central tap, is plotted against the SNR. This plot was obtained over a range of different reference signal parameters, numbers of resource blocks, numbers of macro-UEs, SNRs from each macro-UE and frequency resource assignments. The simulation also included fading effects.

Thus, it can be seen from FIG. 5 that this metric, based on the autocorrelation function, can be used to estimate or predict the SNR in many cases. However, there are a number of points in the plot where although the SNR is high, the metric remains low. This scatter to the right hand side of the plot is potentially problematic, since in these cases nearby macro-UEs might not be protected by the femtocell base station 8. This scatter can be due to fading as well as differences between the autocorrelation functions of the different Zadoff-Chu basis sequences.

An alternative class of metric for the estimation of the SNR can be based on the statistics of the time domain waveform. One simple metric is the peak to average power ratio (PAPR). High SNR reference signals should have low PAPR, whereas Gaussian noise has a relatively high PAPR.

Figure 6:
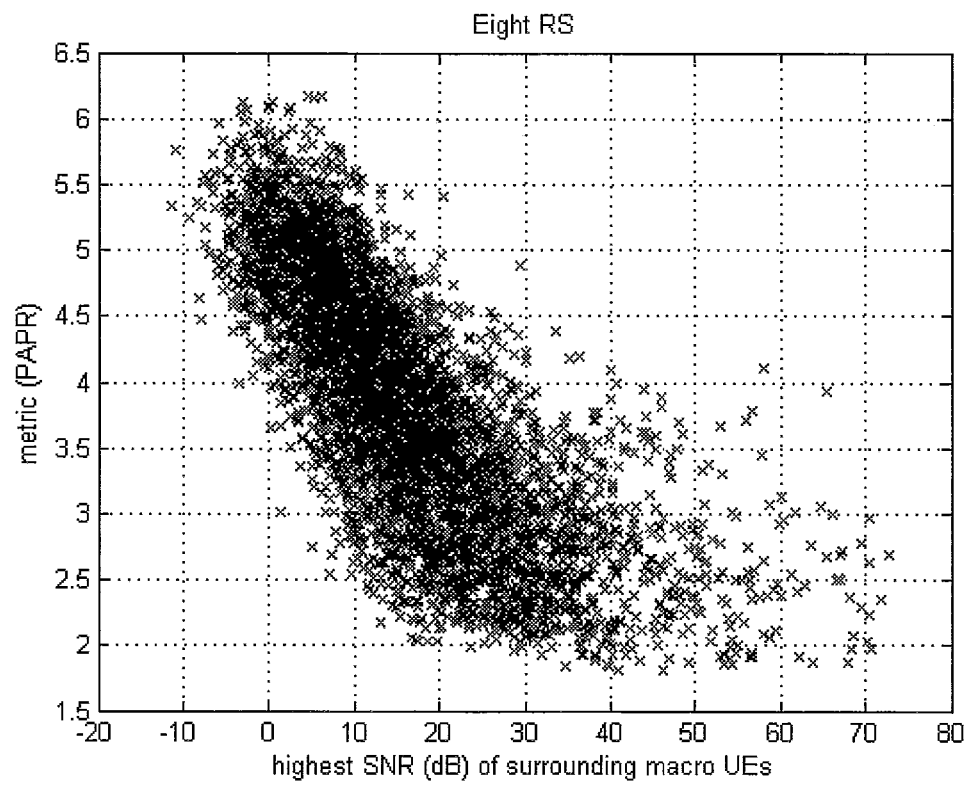
FIG. 6 is a graph illustrating a plot of peak to average power ratios against signal to noise ratio.

Results for this metric (in linear units) are shown in FIG. 6 and it can be seen that there is an even larger scatter apparent in the PAPR metric than the autocorrelation metric, and as such the PAPR metric (and other metrics based on statistics of the power) are less attractive for estimating the SNR of the uplink reference signal.

However, it has been observed that the scattering between the autocorrelation and PAPR metrics is independent, i.e. for the problematic points with high SNR but abnormally low autocorrelation metric, the PAPR tends to remain low (as expected for high SNR signals). For such points, the autocorrelation metric can be adjusted (upwards). This approach can be used to reduce the scatter in the autocorrelation metric, and therefore improve the estimation of the SNR. For example, if the PAPR p (in linear units) is less than 3, then a minimum value can be applied to the metric, this minimum value being given by 400+(3-p)*50.

Two additional approaches for further reducing the scatter in the autocorrelation metric have been identified.

Firstly, as the autocorrelation peaks of the reference signals tend to reduce in magnitude with distance from the main central peak, then some shaping of the autocorrelation function can be applied. To avoid an increase in the "false detection" rate, it is important that this is only done for samples in the autocorrelation function which are already significantly above the noise level—and so a threshold is applied prior to applying this shaping. For example, if the metric is greater than 120 and the offset from the centre tap is n then the metric can be increased by 0.6 n.

Secondly, the scatter can be reduced by obtaining results over multiple measurements, for example by taking the maximum metric obtained from a set of four or eight measurements.

Figure 7:
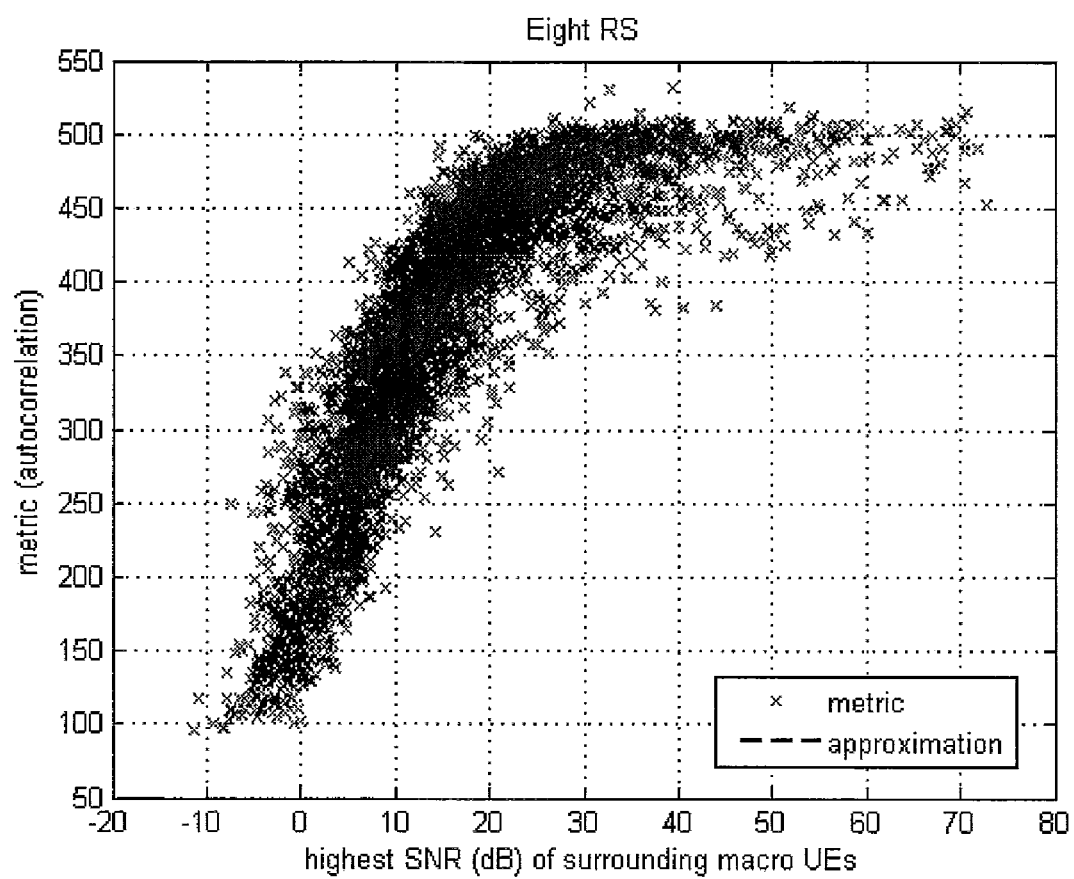
FIG. 7 is a graph illustrating a plot of autocorrelation function peaks against signal to noise ratio in which the scatter has been reduced.

By using all of these techniques, the scatter in the autocorrelation metric is significantly reduced. FIG. 7 illustrates the resulting relationship between the autocorrelation metric and the SNR.

The femtocell base station 8 can make use of the relationship between the autocorrelation function and the SNR to determine the SNR of an uplink signal. A method of estimating the SNR of the Zadoff-Chu reference signal in accordance with an embodiment of the invention is shown in more detail in FIG. 8.

Firstly, the femtocell base station 8 obtains a "rough" synchronization to the macrocell (via a network monitor mode, or, if the standards allow, via macrocell timing measurement reports included in mobile device measurements, or via the X2 interface).

This rough synchronization allows the femtocell base station 8 to estimate roughly where in time the uplink reference signals from macro-UEs are likely to be. In nearly all cases, this is the centre symbol in the 0.5 ms uplink sub-frame.

It will be appreciated that this estimation will be subject to some error due to propagation delay from the macrocell base station 4 and the timing advance used by macro-UEs 12. In the case of over-the-air synchronization, which is assumed hereafter, the error will be up to one macrocell round-trip propagation delay, which for a cell of 5 km is 33 us which is roughly half the duration of an orthogonal frequency division multiplexing (OFDM) symbol. The error means that signals received from macro-UEs 12 may arrive earlier than expected at the femtocell base station 8.

Figure 8:
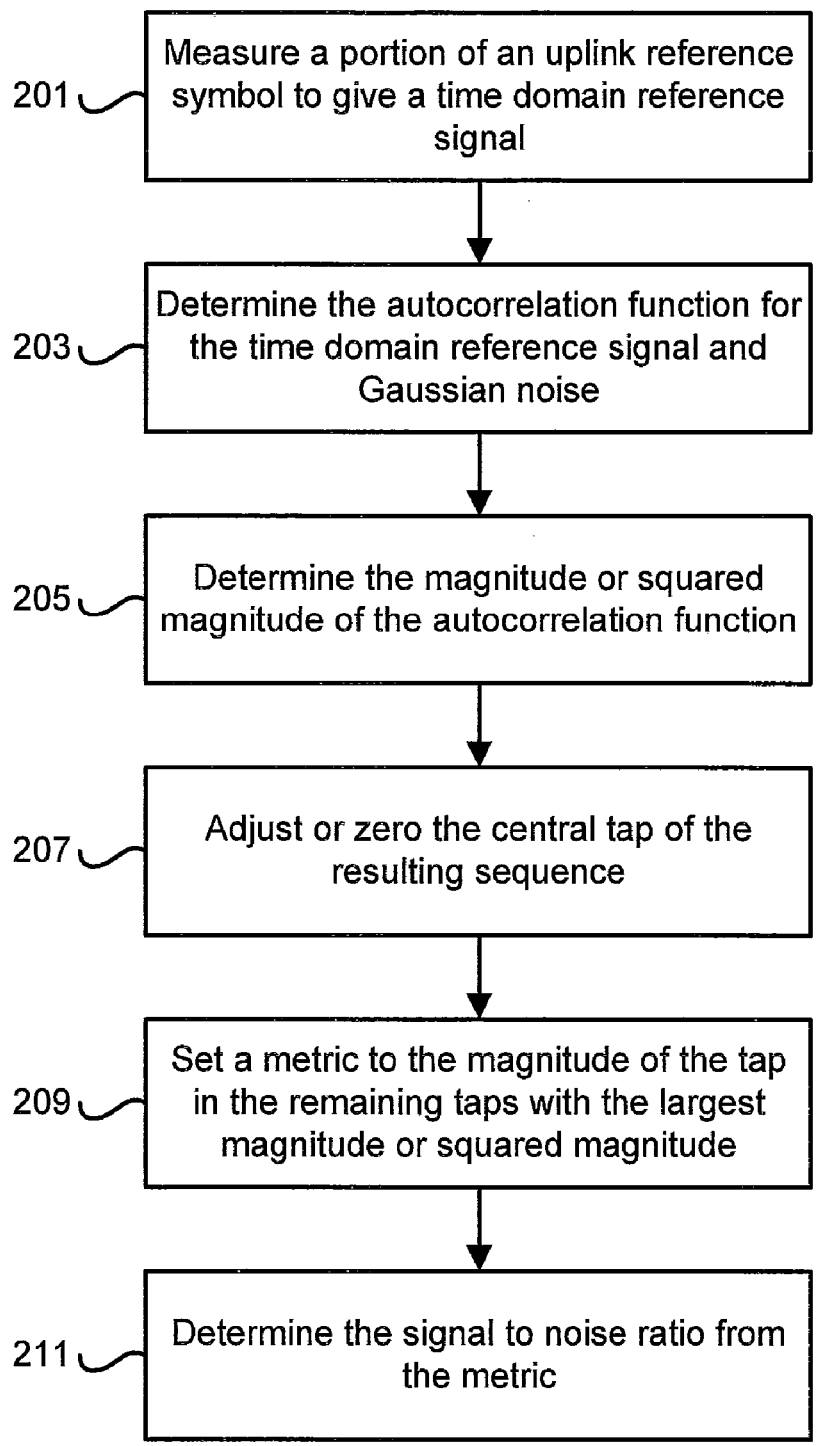
FIG. 8 is a flow chart illustrating a method of estimating a signal quality of a reference signal in an uplink in accordance with an exemplary embodiment of the invention.

Therefore, in step 201 of FIG. 8, the femtocell base station 8 measures or captures a portion of the uplink reference symbol to give a time domain reference signal. For example, the femtocell base station 8 obtains the time domain reference signal from the first 512 samples of the reference symbol (assuming a 10 MHz bandwidth with 1024 samples plus a cyclic prefix per OFDM symbol). Despite the timing uncertainty for over-the-air synchronization, this captured portion of the reference symbol should only contain reference signal samples from macro-UEs 12 that are near to the femtocell base station 8 (i.e. there shouldn't be any samples of data symbols).

In this step, a scheduler in the femtocell base station 8 may be used to ensure that there will be no uplink transmissions from femto-UEs 12 to the femtocell base station 8 that might interfere with this measurement.

In step 203, the femtocell base station 8 determines the autocorrelation function for the time domain reference signal and (filtered) Gaussian noise.

In one implementation, the femtocell base station 8 does this by normalizing the captured time domain signal to give unit power, with the resulting sequence being denoted r, taking the fast Fourier transform (FFT) of this sequence to give f, calculating the squared magnitude ($I^2+Q^2$) for each sample of f and taking the inverse FFT of the resulting sequence to give the autocorrelation sequence a.

As the autocorrelation sequence a determined in step 203 is symmetrical (see FIG. 4), only half of the samples in a need to be retained by the femtocell base station 8 for further processing.

In step 205, the femtocell base station 8 takes the magnitude (or, in alternative implementations, the squared magnitude) of sequence a and then, in step 207, adjusts or zeros the central tap (corresponding to zero time lag in the autocorrelation function).

It may also be necessary to adjust or zero the tap adjacent to the central tap if this tap is significantly influenced by filtering in the receive path. Such filtering has a fixed characteristic so the decision as to adjust or zero this tap is a design decision.

Then, in step 209, the femtocell base station 8 finds the tap with the largest magnitude (or squared magnitude) in the remaining taps, and sets the value of a metric m to this magnitude (or squared magnitude).

The femtocell base station 8 can then determine the signal to noise ratio of the uplink reference signal using this metric (step 211). The value of the SNR for the determined metric m can be determined from the relationship shown in FIG. 5 or FIG. 7, for example using a curve-fitting technique or a look-up table.

As described above, the accuracy of the SNR estimation can be improved by considering the PAPR of the signal, shaping the autocorrelation function based on the distance of the peak used to determine the metric from the central tap and/or the metric may be estimated from signals received in multiple time slots.

Therefore, the metric m may be adjusted as a function of distance from the central tap for example by applying a simple linear function to the metric m determined in step 209. This linear function can be as described above.

Additionally or alternatively, the metric m may be adjusted as a function of the peak to average power ratio of the captured portion of the uplink reference symbol. Specifically if the PAPR is below a threshold (for example 3 in linear units) then a minimum value can be imposed on the metric (again this can be a simple linear function of PAPR). Again, this linear function can be as described above.

Again, additionally or alternatively, the metric m or SNR may be estimated from uplink reference signals captured in multiple time slots and, for example, the highest value of the SNR obtained from these measurements can be used by the femtocell base station 8 to adjust its maximum permitted transmission power.

FIGS. 9 to 12 illustrate the performance benefits of the approach described above.

Figure 9:
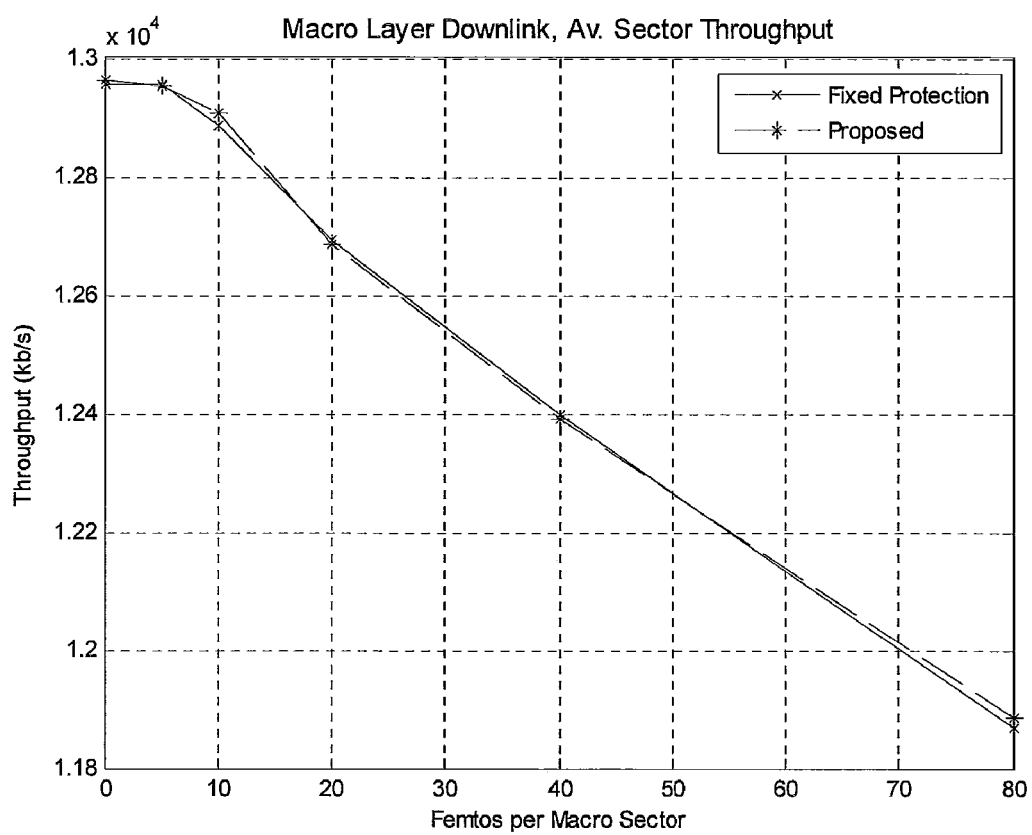
FIG. 9 is a graph illustrating the change in throughput on a macrocell downlink against femtocell base station density in a macrocell sector.

FIG. 9 illustrates how the data throughput on a downlink from a macrocell base station is affected by an increasing number of active femtocell base stations within the coverage area of the macrocell base station for both a conventional fixed power cap and the scheme described above. In particular, it can be seen that there is a negligible difference in the data throughput between the conventional scheme and the scheme described above.

Figure 10:
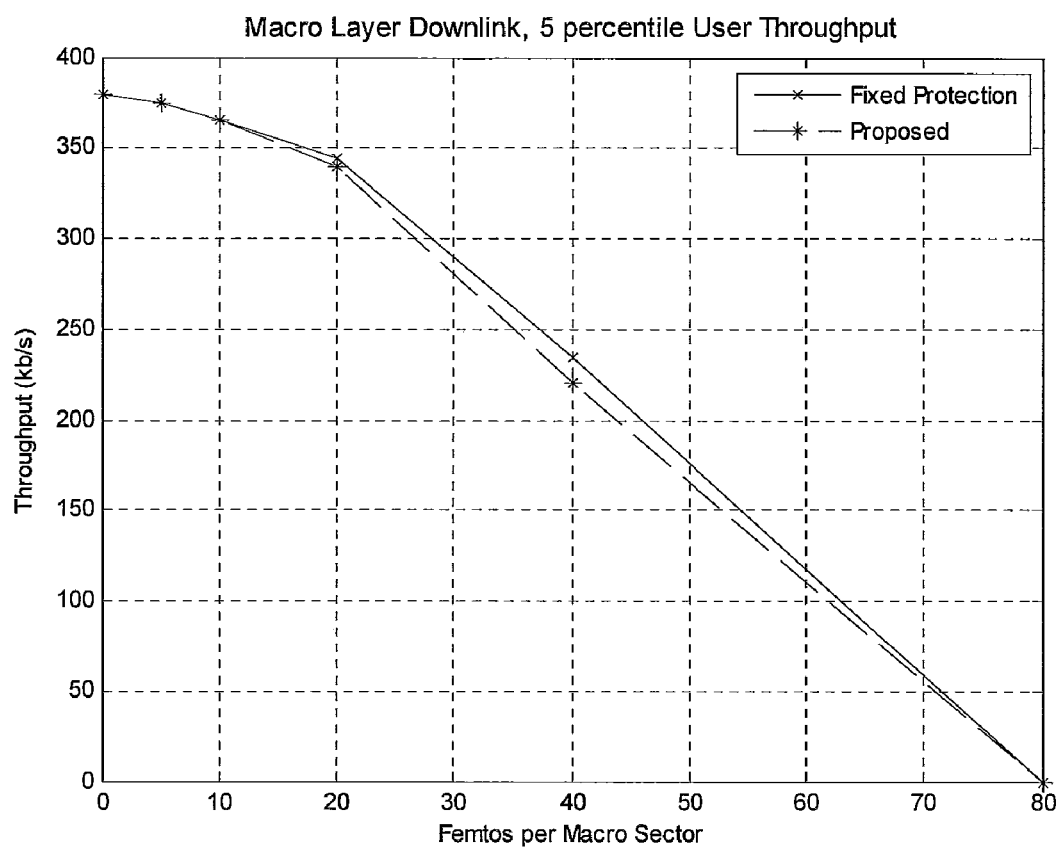
FIG. 10 is a graph illustrating the change in throughput on a macrocell downlink against femtocell base station density for a user equipment at the edge of the macrocell.

FIG. 10 illustrates how the data throughput on a downlink from a macrocell base station to cell edge (5 percentile) macro-UEs is affected by an increasing number of active femtocell base stations within the coverage area of the macrocell base station for a conventional scheme and a scheme as described above. Again, there is almost a negligible difference between the two schemes.

Figure 11:
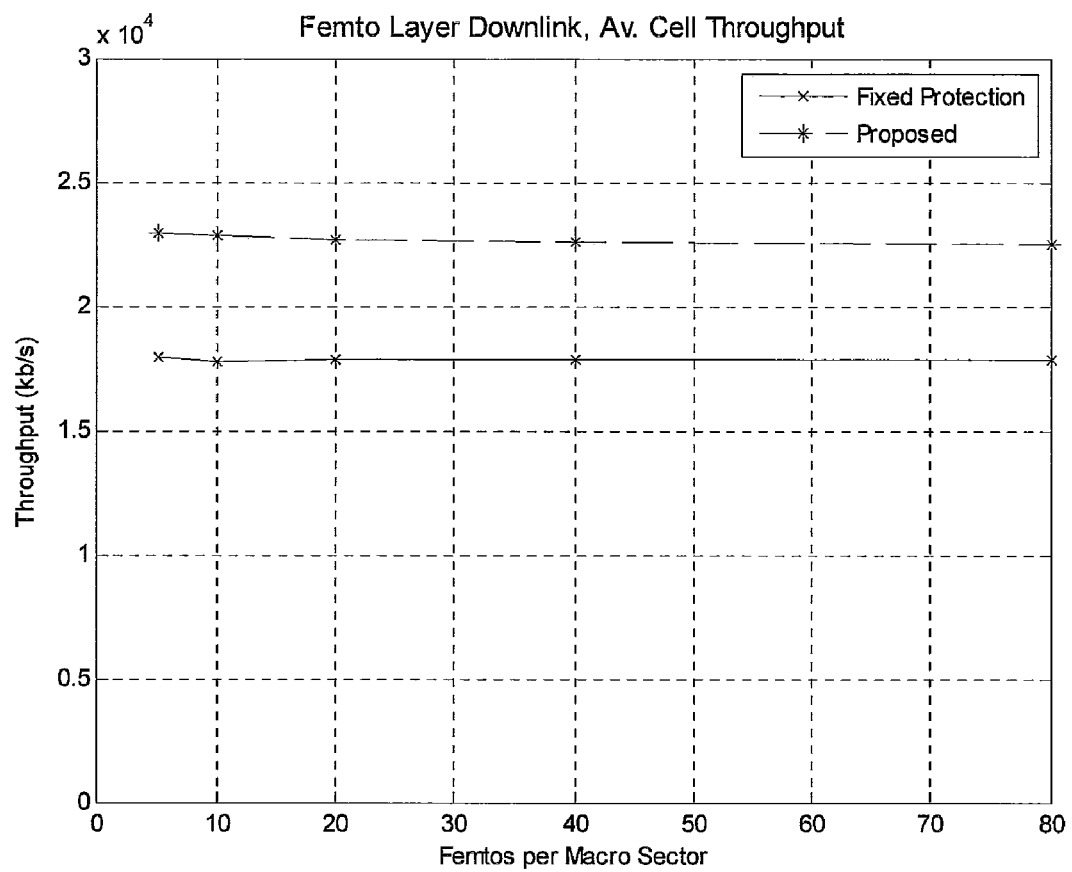
FIG. 11 is a graph illustrating the change in throughput on a femtocell downlink against femtocell base station density.

FIG. 11 plots the data throughput on a downlink from a femtocell base station against the number of active femtocell base stations within the coverage area of the macrocell base station for both a conventional fixed power cap and the scheme according to the invention. It can be seen that the scheme described above provides an approximate increase in data throughput of 5 Mb/s regardless of the number of active femtocell base stations, which is roughly equivalent to an improvement of 25% in the data throughput.

Figure 12:
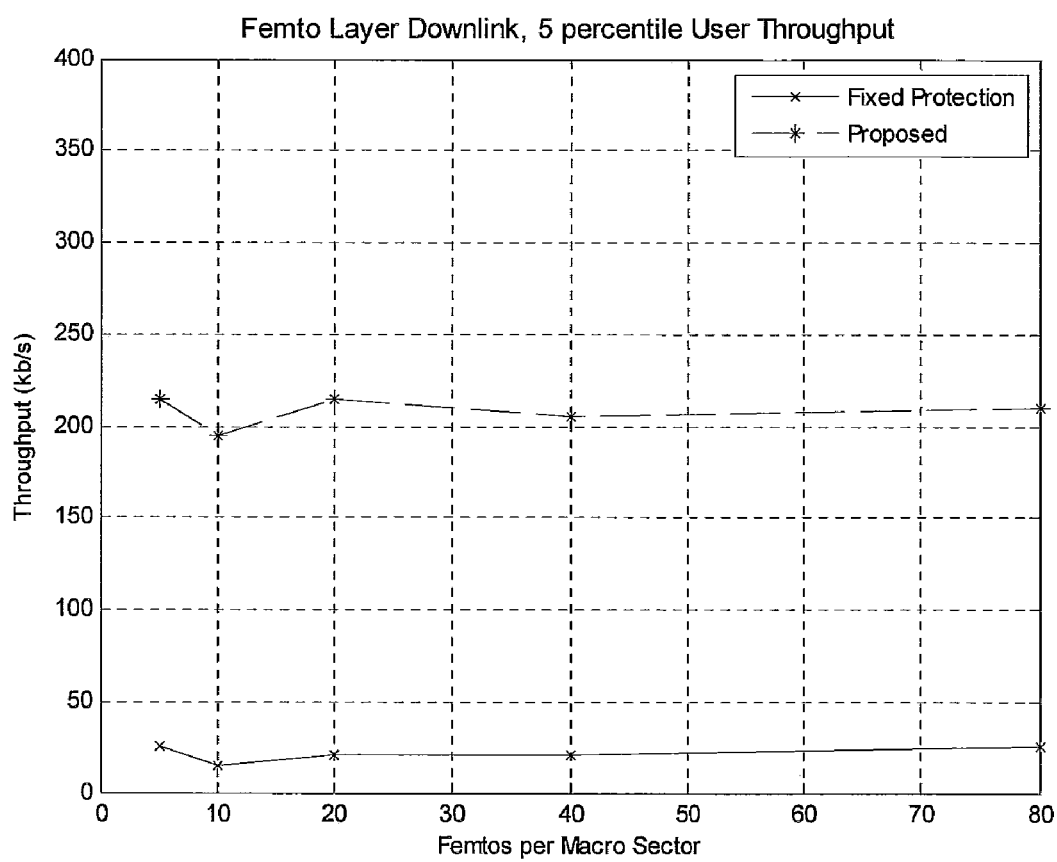
FIG. 12 is a graph illustrating the change in throughput on a femtocell downlink against femtocell base station density for a user equipment at the edge of the femtocell.

FIG. 12 plots the data throughput on a downlink from a femtocell base station to cell edge (5 percentile) femto-UEs against the number of active femtocell base stations within the coverage area of the macrocell base station for a conventional scheme and a scheme as described above. It can be seen that for cell edge (5 percentile) femto-UEs the scheme described above provides an approximate increase in data throughput of 190 kb/s regardless of the number of active femtocell base stations, which translates to an eight-fold increase in the data throughput.

Therefore, these graphs indicate that the adaptation of the maximum permitted transmission power according to the invention provides performance benefits for femto-UEs over the conventional fixed maximum permitted transmission power scheme, while offering the same protection to the macrocell base station downlink.

Although the invention has been described in terms of a method of estimating a signal quality, it will be appreciated that the invention can be embodied in a femtocell base station that comprises a processor and transceiver circuitry configured to perform the described method.

Furthermore, while the invention has been presented as a method in a femtocell base station of estimating a quality of a signal transmitted from a macro-UE to a macrocell base station (or from a femto-UE to another femtocell base station) that allows the femtocell base station to control its maximum permitted transmission power, it will be appreciated that the signal quality estimated using the method according to the invention can be used for other purposes, and can be performed by elements in a communication network other than femtocell base stations, such as macrocell base stations (eNBs) or mobile devices.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of estimating a quality of a signal, the method in a first device comprising:
    measuring a signal transmitted from a second device to a third device;
    determining a value of a metric from an autocorrelation function of the measured signal by calculating a magnitude of the autocorrelation function and adjusting or zeroing a central tap in an output of the step of calculating; and
    determining an estimate of the quality of the signal from the determined metric.

2. The method as claimed in claim 1, wherein the step of measuring comprises measuring the signal in the time domain, and the step of determining a value of a metric comprises determining the autocorrelation function of the time domain signal and noise.

3. The method as claimed in claim 1, wherein the step of determining a value of a metric comprises: normalizing the measured signal to give a sequence r; taking the fast Fourier transform of this sequence to give f; determining the squared magnitude of each sample in f; and taking the inverse fast Fourier transform of the sequence resulting from the step of determining the squared magnitude to give an autocorrelation sequence a.

4. The method as claimed in claim 1, wherein the step of determining a value of a metric from an autocorrelation function of the measured signal comprises calculating the squared magnitude of the autocorrelation function.

5. The method as claimed in claim 1, wherein the step of determining a value of a metric further comprises adjusting or zeroing the tap adjacent the central tap in the output of the step of calculating.

6. The method as claimed in claim 1, wherein the step of determining a value of a metric comprises: identifying the tap with the largest magnitude in the taps remaining in the output of the step of calculating; and setting the metric to the value of the magnitude of the identified tap.

7. The method as claimed in claim 4, wherein the step of determining a value of a metric comprises adjusting or zeroing the central tap in the output of the step of calculating, and wherein the step of determining a value of a metric further comprises: identifying the tap with the largest squared magnitude in the taps remaining in the output of the step of calculating; and setting the metric to the value of the squared magnitude of the identified tap.

8. The method as claimed in claim 6, wherein the step of determining a value of a metric further comprises: adjusting the value of the metric based on the distance of the identified tap from the central tap.

9. The method as claimed in claim 6 wherein the step of determining a value of a metric further comprises: adjusting the value of the metric based on a function of a peak to average power ratio of the measured signal.

10. The method as claimed in claim 9, wherein the step of adjusting the value of the metric based on a function of a peak to average power ratio of the measured signal comprises: in the event that the peak to average power ratio of the measured signal is below a threshold value, adjusting the value of the metric to a minimum value.

11. The method as claimed in claim 1, wherein the step of determining an estimate of the quality of the signal from the determined metric comprises comparing the determined metric to a look-up table.

12. The method as claimed in claim 1, wherein the step of determining an estimate of the quality of the signal from the determined metric comprises using a curve-fitting technique to match the determined metric to a predetermined relationship between values for the metric and the quality of the signal.

13. The method as claimed in claim 1, wherein the step of measuring comprises measuring a Zadoff-Chu reference signal transmitted from the second device to the third device.

14. The method as claimed in claim 13, wherein the step of measuring a Zadoff-Chu reference signal comprises estimating the position of the Zadoff-Chu reference signal in time.

15. The method as claimed in claim 13, wherein the step of measuring comprises measuring a portion of the Zadoff-Chu reference signal.

16. The method as claimed in claim 1, further comprising the step of using a scheduler to ensure that no signals will be transmitted to the first device from other devices associated therewith that might interfere with the execution of the step of measuring.

17. The method as claimed in claim 1, wherein the quality of the signal is a signal to noise ratio.

18. The method as claimed in claim 1, wherein the first device is a femtocell base station, the second device is a mobile device and the third device is a macrocell base station or another femtocell base station, and wherein the mobile device is associated with the macrocell base station or said another femtocell base station.

19. A network element for use in a communication network, the network element comprising a first device configured to:
- measure a signal transmitted from a second device to a third device;
- determine a value of a metric from an autocorrelation function of the measured signal by calculating a magnitude of the autocorrelation function and adjusting or zeroing a central tap in an output of the step of calculating; and
- determine an estimate of the quality of the signal from the determined metric.

20. The network element as claimed in claim 19, wherein the network element comprises a femtocell base station.

21. A method of estimating a quality of a signal, the method in a first device comprising:
- measuring a signal transmitted from a second device to third device;
- determining a value of metric from an autocorrelation function of the measured signal which includes calculating the magnitude of the autocorrelation function and adjusting or zeroing a central tap in an output resulting from the calculating; and
- determining an estimate of the quality of the signal from the determined metric.

22. A method of estimating a quality of a signal, the method in a first device comprising:
- measuring a signal transmitted from a second device to a third device;
- determining a value of a metric from an autocorrelation function of the measured signal by calculating a squared magnitude of the autocorrelation function such that the calculating includes adjusting or zeroing a central tap in an output generated by the calculating; and
- determining an estimate of the quality of the signal from the determined metric.

* * * * *